United States Patent
Sakata et al.

(10) Patent No.: US 9,455,468 B2
(45) Date of Patent: Sep. 27, 2016

(54) ELECTROCHEMICAL DEVICE AND NONAQUEOUS ELECTROLYTE SOLUTION FOR ELECTROCHEMICAL DEVICE

(75) Inventors: Hideo Sakata, Settsu (JP); Meiten Koh, Settsu (JP); Akiyoshi Yamauchi, Decatur, AL (US); Hitomi Nakazawa, Settsu (JP); Tomoyo Sanagi, Moriguchi (JP); Aoi Nakazono, Settsu (JP); Yuki Adachi, Settsu (JP); Kyouhei Sawaki, Settsu (JP); Akinori Tani, Settsu (JP); Masahiro Tomita, Settsu (JP); Mayuko Taeda, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 60 days.

(21) Appl. No.: 14/008,356

(22) PCT Filed: Mar. 30, 2012

(86) PCT No.: PCT/JP2012/058629
§ 371 (c)(1),
(2), (4) Date: Sep. 27, 2013

(87) PCT Pub. No.: WO2012/133798
PCT Pub. Date: Oct. 4, 2012

(65) Prior Publication Data
US 2014/0023938 A1    Jan. 23, 2014

(30) Foreign Application Priority Data
Mar. 31, 2011  (JP) ................. 2011-080305

(51) Int. Cl.
| H01M 10/0569 | (2010.01) |
| H01M 10/0525 | (2010.01) |
| H01G 11/54 | (2013.01) |
| H01M 10/052 | (2010.01) |
| H01M 10/0567 | (2010.01) |
| H01M 10/0568 | (2010.01) |

(52) U.S. Cl.
CPC ......... H01M 10/0525 (2013.01); H01G 11/54 (2013.01); H01M 10/052 (2013.01); H01M 10/0567 (2013.01); H01M 10/0569 (2013.01); H01M 10/0568 (2013.01); Y02E 60/122 (2013.01); Y02E 60/13 (2013.01)

(58) Field of Classification Search
None
See application file for complete search history.

(56) References Cited

U.S. PATENT DOCUMENTS

| 2009/0183856 A1 | 7/2009 | Bulinski et al. |
| 2009/0253044 A1 | 10/2009 | Nogi et al. |
| 2009/0253048 A1 | 10/2009 | Shima |
| 2011/0195317 A1 | 8/2011 | Koh et al. |

FOREIGN PATENT DOCUMENTS

| JP | 11-195429 A | 7/1999 |
| JP | 11307120 A | 11/1999 |
| JP | 2002500423 A | 1/2002 |
| JP | 2002-075440 A | 3/2002 |
| JP | 2002-75440 A | 3/2002 |
| JP | 2002-193892 A | 7/2002 |
| JP | 200317066 A | 1/2003 |
| JP | 2006-210816 A | 8/2006 |
| JP | 2008-257988 A | 10/2008 |
| WO | 9934472 A1 | 7/1999 |
| WO | 2006/132372 A1 | 12/2006 |
| WO | 2009094278 A1 | 7/2009 |
| WO | 2010013739 A1 | 2/2010 |

OTHER PUBLICATIONS

English translation of International Preliminary Report on Patentability and Written Opinion of the International Searching Authority for PCT Appln. No. PCT/JP2012/058629, issued Oct. 8, 2013.
Nanbu et al., "Electrolytic characteristics of fluoromethyl methyl carbonate for lithium rechargeable batteries", Journal of Electroanalytical Chemistry and Interfacial Electrochemistry, Elsevier, Oct. 18, 2008, vol. 625, No. 1, pp. 7-15, XP025817972.
Extended European Search Report dated Jul. 30, 2014, issued by the European Patent Office in corresponding application No. 12764813.7.
International Search Report for PCT/JP2012/058629 dated Jun. 19, 2012.

*Primary Examiner* — Lucas J O'Donnell
(74) *Attorney, Agent, or Firm* — Sughrue Mion, PLLC

(57) ABSTRACT

The present invention aims to provide an electrochemical device excellent in high temperature storage characteristics and cycling characteristics at high voltages, and a nonaqueous electrolyte for the electrochemical device. The present invention relates to an electrochemical device including: a positive electrode; a negative electrode; and a nonaqueous electrolyte containing a nonaqueous solvent and an electrolyte salt, wherein the nonaqueous solvent contains a fluorinated linear carbonate represented by the formula (1):

$$RfOCOOR \qquad (1)$$

(wherein Rf represents a C1-4 fluorinated alkyl group and R represents a C1-4 alkyl group), and further contains following compounds of (I) to (III) in a total amount of not more than 5000 ppm relative to the fluorinated linear carbonate: (I) a compound represented by the formula (2)

$$RfOH \qquad (2)$$

(wherein Rf is defined as above); (II) a compound represented by the formula (3)

$$ROH \qquad (3)$$

(wherein R is defined as above); and (III) a compound represented by the formula (4)

$$ROCOCl \qquad (4)$$

(wherein R is defined as above).

5 Claims, No Drawings

ELECTROCHEMICAL DEVICE AND NONAQUEOUS ELECTROLYTE SOLUTION FOR ELECTROCHEMICAL DEVICE

CROSS REFERENCE TO RELATED APPLICATIONS

This application is a National Stage of International Application No. PCT/JP2012/058629 filed Mar. 30, 2012, claiming priority based on Japanese Patent Application No. 2011-080305 filed Mar. 31, 2011, the contents of all of which are incorporated herein by reference in their entirety.

TECHNICAL FIELD

The present invention relates to an electrochemical device including a nonaqueous electrolyte containing a nonaqueous solvent in which the amount of a specific compound is reduced and an electrolyte salt. The present invention also relates to a nonaqueous electrolyte for an electrochemical device. The present invention further relates to a fluorinated linear carbonate in which the amount of a specific compound is reduced.

BACKGROUND ART

Commonly used nonaqueous electrolytes for electrochemical devices such as lithium ion secondary batteries are electrolytes containing an electrolyte salt (e.g., $LiPF_6$, $LiBF_4$) dissolved in a nonaqueous solvent (e.g., ethylene carbonate, propylene carbonate, dimethyl carbonate). Such hydrocarbon solvents, however, have a low oxidation potential, and therefore the electrolyte may be decomposed in high voltage batteries produced in the future.

Patent Literature 1 discloses that a nonaqueous electrolyte secondary battery including a fluorinated linear carbonate suppresses gassing caused by electrodialysis and is highly safe. Patent Literature 1, however, does not mention about impurities of the compound. In addition, such a nonaqueous electrolyte secondary battery may have its discharge capacity lowered when left in a high-temperature environment or after repetitive charge-discharge cycles.

CITATION LIST

Patent Literature

Patent Literature 1: JP-A H11-195429

SUMMARY OF INVENTION

Technical Problem

The present invention aims to provide an electrochemical device excellent in high temperature storage characteristics and cycling characteristics at high voltages, and a nonaqueous electrolyte for the electrochemical device. The present invention also aims to provide a fluorinated linear carbonate in which the amount of a specific compound is reduced.

Solution to Problem

The present inventors made various investigations to solve the above problem, and found that use of a nonaqueous solvent in which the amount of specific impurities is reduced can solve the problem, thereby completing the present invention.

Specifically, the present invention relates to an electrochemical device including: a positive electrode; a negative electrode; and a nonaqueous electrolyte containing a nonaqueous solvent and an electrolyte salt, wherein the nonaqueous solvent contains a fluorinated linear carbonate represented by the formula (1):

$$RfOCOOR \tag{1}$$

(wherein Rf represents a C1-4 fluorinated alkyl group and R represents a C1-4 alkyl group), and further contains following compounds of (I) to (III) in a total amount of not more than 5000 ppm relative to the fluorinated linear carbonate:

(I) a compound represented by the formula (2)

$$RfOH \tag{2}$$

(wherein Rf is defined as above);

(II) a compound represented by the formula (3)

$$ROH \tag{3}$$

(wherein R is defined as above); and (III) a compound represented by the formula (4)

$$ROCOCl \tag{4}$$

(wherein R is defined as above).

The fluorinated linear carbonate is preferably $CF_3CH_2OCOOCH_3$ or $CF_3CH_2OCOOCH_2CH_3$.

The amount of the fluorinated linear carbonate represented by the formula (1) is preferably 0.01 to 90% by mass in the nonaqueous solvent.

The electrochemical device is preferably a lithium ion secondary battery.

The present invention also relates to a nonaqueous electrolyte for an electrochemical device, including: a nonaqueous solvent; and an electrolyte salt, wherein the nonaqueous solvent contains a fluorinated linear carbonate represented by the formula (1):

$$RfOCOOR \tag{1}$$

(wherein Rf represents a C1-4 fluorinated alkyl group and R represents a C1-4 alkyl group), and further contains following compounds of (I) to (III) in a total amount of not more than 5000 ppm relative to the fluorinated linear carbonate:

(I) a compound represented by the formula (2)

$$RfOH \tag{2}$$

(wherein Rf is defined as above);

(II) a compound represented by the formula (3)

$$ROH \tag{3}$$

(wherein R is defined as above); and (III) a compound represented by the formula (4):

$$ROCOCl \tag{4}$$

(wherein R is defined as above).

The present invention also relates to a fluorinated linear carbonate which is represented by the formula (1-1):

$$RfOCOOR \tag{1-1}$$

(wherein Rf represents $CF_3CH_2$— and R represents —$CH_3$ or —$CH_2CH_3$) and which contains following compounds of (I) to (III) in a total amount of not more than 5000 ppm:

(I) a compound represented by the formula (2-1)

$$RfOH \tag{2-1}$$

(wherein Rf is defined as above);

(II) a compound represented by the formula (3-1)

$$ROH \tag{3-1}$$

(wherein R is defined as above); and (III) a compound represented by the formula (4-1)

$$ROCOCl \quad (4\text{-}1)$$

(wherein R is defined as above).

Advantageous Effects of Invention

The present invention provides a high-capacity electrochemical device excellent in storage characteristics, load characteristics, and cycling characteristics, and an nonaqueous electrolyte for the electrochemical device. The present invention also provides a fluorinated linear carbonate in which the amount of a specific compound is reduced.

DESCRIPTION OF EMBODIMENTS

The electrochemical device of the present invention includes a positive electrode, a negative electrode, and a nonaqueous electrolyte containing a nonaqueous solvent and an electrolyte salt, wherein the nonaqueous solvent contains a fluorinated linear carbonate represented by the formula (1):

$$RfOCOOR \quad (1)$$

(wherein Rf represents a C1-4 fluorinated alkyl group and R represents a C1-4 alkyl group), and further contains following compounds of (I) to (III) in a total amount of not more than 5000 ppm relative to the fluorinated linear carbonate:
(I) a compound represented by the formula (2):

$$RfOH \quad (2)$$

(wherein Rf is defined as above);
(II) a compound represented by the formula (3):

$$ROH \quad (3)$$

(wherein R is defined as above); and
(III) a compound represented by the formula (4):

$$ROCOCl \quad (4)$$

(wherein R is defined as above).

Hereinafter, the compounds represented by the formulae (2) to (4) may also be respectively referred to as a compound (I), a compound (II), and a compound (III).

Examples of the Rf include $CF_3$—, $CF_3CF_2$—, $(CF_3)_2CH$—, $CF_3CH_2$—, $C_2F_5CH_2$—, $HCF_2CF_2CH_2$—, and $CF_3CFHCF_2CH_2$—. In particular, $CF_3CH_2$— is preferable because it has high flame retardance, and excellent rate characteristics and oxidation resistance.

Examples of the R include —$CH_3$, —$CH_2CH_3$, —$CH(CH_3)_2$, and —$C_3H_7$. In particular, —$CH_3$ and —$CH_2CH_3$ are preferable because of their low viscosity and excellent rate characteristics.

Specific examples of the fluorinated linear carbonate include $CF_3CH_2OCOOCH_3$, $CF_3CH_2OCOOCH_2CH_3$, $CF_3CF_2CH_2OCOOCH_3$, and $CF_3CF_2CH_2OCOOCH_2CH_3$. In particular, $CF_3CH_2OCOOCH_3$ and $CF_3CH_2OCOOCH_2CH_3$ are preferable.

The amount of the compound represented by the formula (1) is preferably 0.01 to 90% by mass in the nonaqueous solvent. When the amount of the compound represented by the formula (1) is large, the discharge capacity tends to be reduced. The allowable upper limit of the amount is 90% by mass. The compound represented by the formula (1) is allowed to exert its effect by use in a comparatively small amount. The upper limit of the amount is preferably not more than 30% by mass. The effective lower limit of the amount is not less than 0.1% by mass, and the amount is more preferably not less than 0.5% by mass.

The fluorinated linear carbonate represented by the formula (1) is commonly synthesized by a reaction between the compound (I) and the compound (III). Accordingly, the compounds (I) and (III) which are starting materials may be left as impurities depending on a purification method. In addition, in synthesis of the fluorinated linear carbonate represented by the formula (1), the compound (II) may also be produced as impurities. Since the compounds (I) to (III) are impurities produced by synthesis of the fluorinated linear carbonate represented by the formula (1), the Rf in the formula (1) and the Rf in the formula (2) are the same, and the R in the formula (1) and the R in each of the formulae (3) and (4) are the same.

Detailed description is given on $CF_3CH_2OCOOCH_3$ and $CF_3CH_2OCOOCH_2CH_3$ which are specific preferable examples of the compound represented by the formula (1).

$CF_3CH_2OCOOCH_3$ is commonly synthesized by a reaction between $CF_3CH_2OH$ and $CH_3OCOCl$. Accordingly, $CF_3CH_2OH$ (compound (I-1)) or $CH_3OCOCl$ (compound (III-1)) may be left as impurities. Moreover, $CH_3OH$ (compound (II-1)) may be produced as impurities.

$CF_3CH_2OCOOCH_2CH_3$ is commonly synthesized by a reaction between $CF_3CH_2OH$ and $CH_3CH_2OCOCl$. Accordingly, $CF_3CH_2OH$ (compound (I-1)) or $CH_3CH_2OCOCl$ (compound (III-2)) may be left as impurities. Moreover, $CH_3CH_2OH$ (compound (II-2)) may be produced as impurities.

In the present invention, the total amount of the compounds (I) to (III) is not more than 5000 ppm, preferably not more than 3500 ppm, and still more preferably not more than 2500 ppm relative to the compound represented by the formula (1). If the total amount of the compounds (I) to (III) is larger than 5000 ppm, discharge characteristics tend to be lowered more significantly after storage at high temperatures. Especially, in the case where alcohols derived from the compounds (I) and (II) are left, the alcohols easily react with Li to lower the capacity. Additionally, the compound (III) easily reacts with moisture to produce HCl in the battery, causing rust on the package.

Since the HOMO energies of the compounds (I) to (III) obtained by molecular activation calculation are each higher than that of the compound represented by the formula (1), oxidation resistance thereof is poor. Accordingly, such compounds may be decomposed in high voltage batteries, being a cause of deterioration. Based on the above fact, it is presumable that the smaller the total amount of the compounds (I) to (III) in the nonaqueous solvent, the smaller the degradation in storage characteristics of batteries.

As described above, the compounds (I) to (III) are impurities contained in the compound represented by the formula (1). Accordingly, purification of the compound represented by the formula (1) in advance can adjust the amount of the total amount of the compounds (I) to (III) in the nonaqueous solvent within the above range (i.e., not more than 5000 ppm relative to the compound represented by the formula (1)). Here, ppm is by mass, and the state "not more than 5000 ppm relative to the compound represented by the formula (1)" indicates a state that the amount is not more than 0.5 parts by mass relative to 100 parts by mass of the compound represented by the formula (1).

Exemplary methods for purifying the compound represented by the formula (1) include rectification using a distillation column with 10 or more theoretical plates.

The compound represented by the formula (1) may be distilled under reduced pressure.

In purification of the compound represented by the formula (1), distillation at high temperatures produces by-products. For example, in the case where the compound represented by the formula (1) is $CF_3CH_2OCO_2CH_3$, the following reaction is carried out and a by-product is produced.

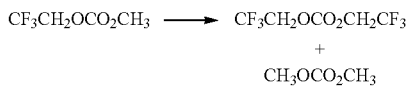

$$CF_3CH_2OCO_2CH_3 \longrightarrow CF_3CH_2OCO_2CH_2CF_3$$
$$+$$
$$CH_3OCO_2CH_3$$

Distillation of the compound represented by the formula (1) under reduced pressure enables distillation at low temperatures, which further suppresses production of such by-products.

In this case, distillation is performed at a temperature of preferably not higher than 90° C., and more preferably not higher than 70° C.

Other components of the nonaqueous solvent may be any known solvents for nonaqueous electrolyte secondary batteries. Examples thereof include: alkylene carbonates such as ethylene carbonate, propylene carbonate, or butylene carbonate; dialkyl carbonates (preferably having C1-4 alkyl groups) such as dimethyl carbonate, diethyl carbonate, di-n-propyl carbonate, or ethyl methyl carbonate; cyclic ethers such as tetrahydrofuran or 2-methyl tetrahydrofuran; linear ethers such as dimethoxyethane or dimethoxymethane; cyclic carboxylic acid ester compounds such as γ-butyrolactone or γ-valerolactone; and linear carboxylic acid esters such as methyl acetate, methyl propionate, or ethyl propionate. Two or more of these may be used in combination.

A preferable nonaqueous solvent mainly contains alkylene carbonate and dialkyl carbonate. Especially, a mixed solvent containing 20 to 45% by volume of alkylene carbonate having a C2-4 alkylene group and 55 to 80% by volume of dialkyl carbonate having a C1-4 alkyl group is preferable, because such a solvent allows the electrolyte to have high electric conductivity, leading to excellent cycling characteristics and high-current discharge characteristics.

Examples of the alkylene carbonates having a C2-4 alkylene group include ethylene carbonate, propylene carbonate, and butylene carbonate. In particular, ethylene carbonate or propylene carbonate is preferable.

Examples of the dialkyl carbonate having a C1-4 alkyl group include dimethyl carbonate, diethyl carbonate, di-n-propyl carbonate, ethyl methyl carbonate, methyl-n-propyl carbonate, and ethyl-n-propyl carbonate. In particular, dimethyl carbonate, diethyl carbonate, or ethyl methyl carbonate is preferable.

Other examples of a preferable nonaqueous solvent include those containing an organic solvent selected from ethylene carbonate, propylene carbonate, γ-butyrolactone, and γ-valerolactone in an amount of not less than 60% by volume and more preferably not less than 85% by volume. An electrolyte containing a lithium salt dissolved in this nonaqueous solvent is less likely to have solvent evaporation and fluid leakage even when used at high temperatures. In particular, a mixture containing 5 to 45% by volume of ethylene carbonate and 55 to 95% by volume of γ-butyrolactone, or a solvent containing 30 to 60% by volume of ethylene carbonate and 40 to 70% by volume of propylene carbonate are preferable, because cycling characteristics and high-current discharge characteristics are obtained in a good balance.

Other examples of a preferable nonaqueous solvent further include those containing a phosphorous organic solvent. Examples of the phosphorous organic solvent include trimethyl phosphate, triethyl phosphate, dimethyl ethyl phosphate, methyl diethyl phosphate, ethylene methyl phosphate, and ethylene ethyl phosphate. A nonaqueous solvent containing not less than 10% by volume of a phosphorous organic solvent can lower the combustibility of a resulting electrolyte. Especially, an electrolyte preferably contains 10 to 80% by volume of a phosphorous organic solvent and other components mainly including a nonaqueous solvent selected from γ-butyrolactone, γ-valerolactone, alkylene carbonate, and dialkyl carbonate and a lithium salt dissolved in the nonaqueous solvent. In such a case, a balance between cycling characteristics and high-current discharge characteristics is improved.

Preferably, the nonaqueous solvent contains a cyclic carbonate having a carbon-carbon unsaturated bond in a molecule in an amount of preferably not more than 8% by mass and more preferably 0.01 to 8% by mass. The cyclic carbonate in the nonaqueous solvent in an amount within the above range is preferable because it suppresses a secondary reaction of the compound represented by the formula (1) at the negative electrode, thereby further improving the storage characteristics and cycling characteristics. If the amount of the cyclic carbonate is more than 8% by mass, battery characteristics may be lowered after storage. More preferably, the lower limit of the amount is 0.1% by mass and the upper limit is 3% by mass.

Examples of the cyclic carbonate having a carbon-carbon unsaturated bond in a molecule include: vinylenecarbonate compounds such as vinylenecarbonate, methylvinylenecarbonate, ethylvinylenecarbonate, 4,5-dimethylvinylenecarbonate, 4,5-diethylvinylenecarbonate, fluorovinylenecarbonate, or trifluoromethylvinylenecarbonate; and vinyl ethylene carbonate compounds such as 4-vinylethylene carbonate, 4-methyl-4-vinylethylene carbonate, 4-ethyl-4-vinylethylene carbonate, 4-n-propyl-4-vinylene ethylene carbonate, 5-methyl-4-vinylethylene carbonate, 4,4-divinylethylene carbonate, 4,5-divinylethylene carbonate, 4,4-dimethyl-5-methylene ethylene carbonate, or 4,4-diethyl-5-methylene ethylene carbonate. Among these, vinylenecarbonate, 4-vinylethylene carbonate, 4-methyl-4-vinylethylene carbonate, or 4,5-divinylethylene carbonate are preferable, and vinylenecarbonate or 4-vinylethylene carbonate is particularly preferable. Two or more of these may be used in combination.

The nonaqueous solvent of the present invention may further contain a fluorine-containing ether represented by the formula (5):

$$Rf^1\text{—}O\text{—}Rf^2 \tag{5}$$

(wherein, the $Rf^1$ and the $Rf^2$ are the same as or different from each other, and each represent a C1-10 alkyl group or a C1-10 fluoroalkyl group; at least one of them should be a fluoroalkyl group). Here, the nonaqueous solvent preferably contains compounds of (I') and (II') that are impurities of the fluorine-containing ether in the total amount of not more than 5000 ppm relative to the fluorine-containing ether:

(I') a fluorine-containing unsaturated compound (hereinafter, also referred to as a compound (I')); and (II') a hydroxy group-containing compound (hereinafter, also referred to as a compound (II')) represented by the formula (6):

$$Rf^1OH \tag{6}$$

(wherein $Rf^1$ is defined as above).

Specific examples of the fluorine-containing ether represented by the formula (5) include $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $C_6F_{13}OCH_3$, $C_6F_{13}OC_2H_5$, $C_8F_{17}OCH_3$, $C_8F_{17}OC_2H_5$, $CF_3CFHCF_2CH(CH_3)$ $OCF_2CFHCF_3$, $HCF_2CF_2OCH(C_2H_5)_2$, $HCF_2CF_2OC_4H_9$, $HCF_2CF_2OCH_2CH(C_2H_5)_2$, and $HCF_2CF_2OCH_2$ $CH(CH_3)_2$. Among these, in terms of oxidation resistance and compatibility with an electrolyte salt such as $LiPF_6$, at least one compound selected from the group consisting of $HCF_2CF_2OCH_2CF_2CF_2H$ and $HCF_2CF_2CH_2OCF_2CFHCF_3$ is preferable, and $HCF_2CF_2OCH_2CF_2CF_2H$ is more preferable.

The amount of the fluorine-containing ether represented by the formula (5) in the nonaqueous solvent is preferably not more than 40% by mass, and more preferably in a range of 3 to 40% by mass.

The fluorine-containing unsaturated compound (I') is derived from a by-product produced in synthesis of the fluorine-containing ether represented by the formula (5). Specifically, it is produced such that hydrogen fluoride (HF) is eliminated from the fluorine-containing ether represented by the formula (5) and an unsaturated bond is formed therein. More specifically, examples thereof include: (I'-1) $CF_2=CFCH_2OCF_2CF_2H$; (I'-2) $HCF_2CF=CHOCF_2CF_2H$; (I'-3) $CF_2=CFCH_2OCF_2CFHCF_3$; (I'-4) $HCF_2CF_2CH_2OCF=CFCF_3$; (I'-5) $HCF_2CF_2CH_2OCF_2CF=CF_2$; and (I'-6) $HCF_2CF=CHOCF_2CFHCF_3$.

The hydroxy group-containing compound (II') is derived from a starting material used in synthesis of the fluorine-containing ether represented by the formula (5), and is represented by the formula (6):

$$Rf^1OH \qquad (6).$$

Here, $Rf^1$ may be the same as that in the formula (5). Specific examples thereof include (II'-1) $HCF_2CF_2CH_2OH$.

A specific preferable combination is a combination including the fluorine-containing ether represented by the formula (5) that is $HCF_2CF_2CH_2OCF_2CF_2H$, the fluorine-containing unsaturated compound (I') that includes (I'-1) $CF_2=CFCH_2OCF_2CF_2H$ and (I'-2) $HCF_2CF=CHOCF_2CF_2H$, and the hydroxy group-containing compound (II') that is (II'-1) $HCF_2CF_2CH_2OH$, or a combination including the fluorine-containing ether represented by the formula (5) that is $HCF_2CF_2CH_2OCF_2CFHCF_3$, the fluorine-containing unsaturated compound (I') that includes (I'-3) $CF_2=CFCH_2OCF_2CFHCF_3$, (I'-4) $HCF_2CF_2CH_2OCF=CFCF_3$, (I'-5) $HCF_2CF_2CH_2OCF_2CF=CF_2$, and (I'-6) $HCF_2CF=CHOCF_2CFHCF_3$, and the hydroxy group-containing compound (II') that is (II'-1) $HCF_2CF_2CH_2OH$.

The compounds (I') and (II') are impurities contained in fluorine-containing ethers. Accordingly, in the case where the fluorine-containing ether represented by the formula (5) is used, the amount of the compounds (I') and (II') in the nonaqueous solvent is adjusted to fall within the above range (not more than 5000 ppm relative to the fluorine-containing ether) by purifying the fluorine-containing ether before its use. Here, ppm is by mass and the state "not more than 5000 ppm relative to the fluorine-containing ether" indicates a state that the amount is not more than 0.5 parts by mass relative to 100 parts by mass of the fluorine-containing ether.

The upper limit of the total amount of the compounds (I') and (II') is preferably not more than 3500 ppm and more preferably not more than 2000 ppm relative to the fluorine-containing ether. If the total amount of the compounds (I') and (II') is larger than 5000 ppm, discharge characteristics tends to be lowered after storage at high temperatures and cyclic degradation when the voltage is high tends to be greater. Especially, when $Rf^1OH$ (compound (II')) among the compounds (I') and (II') is left, it easily reacts with Li to lower the capacity. Since the fluorine-containing unsaturated compound (I') has a double bond, when the left amount thereof is large, it tends to easily react with moisture and the like in the electrolyte to be decomposed.

In the present invention, the nonaqueous solvent containing the compound represented by the formula (1) and the compound represented by the formula (5) is preferably used, because such nonaqueous solvent enables production of highly safe batteries having high oxidation resistance.

The nonaqueous solvent may optionally contain other useful compounds such as conventionally known additives, dehydrating agents, deoxidizers, or overcharge inhibitors.

Examples of the additives include: carbonate compounds such as fluoroethylene carbonate, trifluoropropylene carbonate, phenyl ethylene carbonate, or erythritane carbonate; carboxylic acid anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, or phenyl succinic anhydride; sulfur-containing compounds such as ethylene sulfite, 1,3-propane sultone, 1,4-butane sultone, methyl methane sulfonate, busulfan, sulfolane, sulfolene, dimethylsulfone, or tetramethylthiuram monosulfide; nitrogen-containing compounds such as 1-methyl-2-pyrrolidinone, 1-methyl-2-piperidone, 3-methyl-2-oxazolidinone, 1,3-dimethyl-2-imidazolidinone, or N-methylsuccinimide; and hydrocarbon compounds such as heptane, octane, cycloheptane, or fluorobenzene. The nonaqueous solvent containing 0.1 to 5% by mass of any of these compounds improves the capacity maintenance after storage at high temperatures and cycling characteristics.

Examples of the overcharge inhibitors include: aromatic compounds such as cyclohexyl benzene, biphenyl, alkylbiphenyl, terphenyl, partially hydrogenated terphenyl, t-butyl benzene, t-amyl benzene, diphenyl ether, benzofuran, or dibenzofuran; partial fluorides of the aromatic compounds, such as 2-fluorobiphenyl; and fluorinated anisole compounds such as 2,4-difluoroanisole, 2,5-difluoroanisole, or 2,6-difluoroanisole. A nonaqueous solvent containing 0.1 to 5% by mass of any of these overcharge inhibitors can suppress bursting and/or firing of overcharged batteries.

Any electrolyte salt may be used in the present invention. Preferably, a lithium salt is used. Examples of the lithium salt include: inorganic lithium salts such as $LiClO_4$, $LiPF_6$, or $LiBF_4$; and fluorinated organic acid lithium salts such as $LiCF_3SO_3$, $LiN(CF_3SO_2)_2$, $LiN(C_2F_5SO_2)_2$, $LiN(CF_3SO_2)$ $(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, or $LiBF_2(C_2F_5SO_2)_2$. Each of these may be used alone, or two or more of these may be used in combination. Among these, $LiPF_6$, $LiBF_4$, $LiCF_3SO_3$, $LiN(CF_3SO_2)_2$, or $LiN(C_2F_5SO_2)_2$ are preferable, and $LiPF_6$ or $LiBF_4$ is particularly preferable. Moreover, use of an inorganic lithium salt such as $LiPF_6$ or $LiBF_4$ and a fluorinated organic lithium salt such as $LiCF_3SO_3$, $LiN(CF_3SO_2)_2$, or $LiN(C_2F_5SO_2)_2$ in combination is preferable because it reduces degradation after storage at high temperatures.

When the nonaqueous solvent contains not less than 55% by volume of γ-butyrolactone, $LiBF_4$ preferably constitutes not less than 50% by mass of the lithium salt. Particularly preferably, the nonaqueous solvent contains 50 to 95% by mass of LiBF$_4$ and 5 to 50% by mass of a lithium salt selected from the group consisting of LiPF$_6$, LiCF$_3$SO$_3$, LiN(CF$_3$SO$_2$)$_2$, and LiN(C$_2$F$_5$SO$_2$)$_2$.

The concentration of the electrolyte salt in the electrolyte is preferably 0.5 to 3 mol/litter. The concentration outside the range tends to lower the electric conductivity of the electrolyte to lower the battery performance.

Examples of the electrochemical device of the present invention include lithium ion secondary batteries and electrical double layer capacitor. Hereinafter, the configuration of a lithium ion secondary battery is described.

Materials of the negative electrode included in the lithium ion secondary battery may be: carbonaceous materials which can occlude and discharge lithium, such as pyrolysates of organic matters produced under various pyrolysis conditions, artificial graphite, or natural graphite; metal oxide materials which can occlude and discharge lithium, such as tin oxide or silicon oxide; lithium metals; or various lithium alloys. Two or more of these negative electrode materials may be used in combination.

The carbonaceous materials which can occlude and discharge lithium is preferably artificial graphite or purified natural graphite prepared by high temperature treatment of a graphitizable pitch obtained from various starting materials, or materials obtained from these graphites by performing a surface treatment on the graphites using a pitch or other organic matters and carbonizing the surface-treated graphites.

The negative electrode may be produced by a common method. For example, a negative electrode material is mixed with a binding agent, a thickener, a conductive material, a solvent and the like into slurry. The slurry is applied to a collector and densified by pressing after drying.

Any binding agent may be used, as long as it is safe for the solvent or electrolyte used in production of electrodes. Examples thereof include polyvinylidene fluoride, polytetrafluoroethylene, polyethylene, polypropylene, styrene/butadiene rubber, isoprene rubber, butadiene rubber, ethylene-acrylic acid copolymers, and ethylene-methacrylic acid copolymers.

Examples of the thickener include carboxy methyl cellulose, methyl cellulose, hydroxy methyl cellulose, ethyl cellulose, polyvinyl alcohol, oxidized starch, phosphorylated starch, and casein.

Examples of the conductive material include: metal materials such as copper or nickel; and carbon materials such as graphite or carbon black.

Examples of the material of the collector for the negative electrode include copper, nickel, and stainless steel. Among these, copper foil is preferable because it is easily formed into a thin film and is cost effective.

Materials of the positive electrode included in the battery are particularly preferably lithium-containing transition metal complex oxides which produce high voltages. Preferable examples thereof include lithium/manganese spinel complex oxides represented by the formula (1): Li$_a$Mn$_{2-b}$M$^1_b$O$_4$ (0.9≤a; 0≤b≤1.5; M$^1$ being a metal selected from the group consisting of Fe, Co, Ni, Cu, Zn, Al, Sn, Cr, V, Ti, Mg, Ca, Sr, B, Ga, In, Si, and Ge), lithium/nickel complex oxides represented by the formula (2): LiNi$_{1-c}$M$^2_c$O$_2$ (0≤c≤0.5; M$^2$ being a metal selected from the group consisting of Fe, Co, Mn, Cu, Zn, Al, Sn, Cr, V, Ti, Mg, Ca, Sr, B, Ga, In, Si, and Ge), and lithium/cobalt complex oxides represented by the formula (3): LiCo$_{1-d}$M$^3_d$O$_2$ (0≤d≤0.5; M$^3$ being a metal selected from the group consisting of Fe, Ni, Mn, Cu, Zn, Al, Sn, Cr, V, Ti, Mg, Ca, Sr, B, Ga, In, Si, and Ge).

Specifically, preferable examples thereof include LiCoO$_2$, LiMnO$_2$, LiNiO$_2$, LiMn$_2$O$_4$, LiNi$_{0.8}$Co$_{0.15}$Al$_{0.05}$O$_2$, and LiNi$_{1/3}$Co$_{1/3}$Mn$_{1/3}$O$_2$ because high-performance lithium ion secondary batteries with high energy density can be produced.

In addition, positive electrode active materials, such as LiFePO$_4$, LiNi$_{0.8}$Co$_{0.2}$O$_2$, Li$_{1.2}$Fe$_{0.4}$Mn$_{0.4}$O$_2$, LiNi$_{0.5}$Mn$_{0.5}$O$_2$, or LiV$_3$O$_6$, may also be used.

The amount of the positive electrode active material is preferably 50 to 99% by mass and more preferably 80 to 99% by mass of the positive electrode composition because the battery capacity is high in such a case.

In the present invention, preferably, the positive electrode active material mainly includes secondary particles with an average particle size of not more than 40 μm and 0.5 to 7.0% by volume of fine particles with an average primary particle size of not more than 1 μm, especially in the case of being used in a large lithium ion secondary battery for a hybrid vehicle or a dispersed power source, because such a battery is required to be a high-power battery. The positive electrode active material containing fine particles with an average primary particle size of not more than 1 μm has a larger area in contact with the electrolyte to promote diffusion of lithium ions between the electrode and the electrolyte, leading to improvement in output performance.

A binding agent for the positive electrode may be the same as that for the negative electrode, and may be any binding agent as long as it is safe for the solvent and the electrolyte used in production of the electrode. Examples thereof include polyvinylidene fluoride, polytetrafluoroethylene, polyethylene, polypropylene, styrene/butadiene rubber, isoprene rubber, butadiene rubber, ethylene-acrylic acid copolymers, and ethylene-methacrylic acid copolymers.

A thickener for the positive electrode may be the same as that for the negative electrode, and examples thereof include carboxy methyl cellulose, methyl cellulose, hydroxy methyl cellulose, ethyl cellulose, polyvinyl alcohol, oxidized starch, phosphorylated starch, and casein.

Examples of the conductive material include carbon materials such as graphite or carbon black.

Examples of the material of the collector for the positive electrode include metals such as aluminum, titanium, or tantalum, and alloys of these. Among these, aluminum or its alloy is preferable.

The material or shape of a separator used in the lithium ion secondary battery of the present invention may be arbitrarily determined, as long as the separator is stable to the electrolyte and has excellent liquid holding property. Preferable are porous sheets or nonwoven fabrics made from polyolefin such as polyethylene or polypropylene.

The battery may be of any shape, and exemplary types include cylindrical, square, laminated, coin, and large types. The shapes and configurations of the positive electrode, negative electrode, and separator may be modified in accordance with the type of the battery.

The present invention further relates to a nonaqueous electrolyte for an electrochemical device, including a nonaqueous solvent and an electrolyte salt, wherein the nonaqueous solvent contains a fluorinated linear carbonate represented by the formula (1):

$$RfOCOOR \qquad (1)$$

(wherein Rf represents a C1-4 fluorinated alkyl group and R represents a C1-4 alkyl group), and further contains the following compounds of (I) to (III) in the total amount of not more than 5000 ppm relative to the fluorinated linear carbonate:

(I) a compound represented by the formula (2):

$$RfOH \quad (2)$$

(wherein Rf is defined as above);
(II) a compound represented by the formula (3):

$$ROH \quad (3)$$

(wherein R is defined as above); and
(III) a compound represented by the formula (4):

$$ROCOCl \quad (4)$$

(wherein R is defined as above).

The nonaqueous solvent and electrolyte salt contained in the nonaqueous electrolyte for an electrochemical device of the present invention and the amounts thereof are the same as those mentioned above.

The present invention further relates to a fluorinated linear carbonate represented by the formula (1-1):

$$RfOCOOR \quad (1\text{-}1)$$

(wherein Rf represents $CF_3CH_2-$, R represents $-CH_3$ or $-CH_2CH_3$), containing the following compounds of (I) to (III) in the total amount of not more than 5000 ppm:
(I) a compound represented by the formula (2-1):

$$RfOH \quad (2\text{-}1)$$

(wherein Rf is defined as above);
(II) a compound represented by the formula (3-1):

$$ROH \quad (3\text{-}1)$$

(wherein R is defined as above); and
(III) a compound represented by the formula (4-1):

$$ROCOCl \quad (4\text{-}1)$$

(wherein R is defined as above).

When R in the formula (1-1) is $-CH_3$, the carbonate is $CF_3CH_2OCOOCH_3$ containing $CF_3CH_2OH$, $CH_3OH$, and $CH_3OCOCl$ in the total amount of not more than 5000 ppm. When R in the formula (1-1) is $-CH_2CH_3$, the carbonate is $CF_3CH_2OCOOCH_2CH_3$ containing $CF_3CH_2OH$, $CH_3CH_2OH$, and $CH_3CH_2OCOCl$ in the total amount of not more than 5000 ppm.

An electrochemical device including a nonaqueous solvent containing a fluorinated linear carbonate that contains the compounds of (I) to (III) in the total amount of not more than 5000 ppm, and a nonaqueous electrolyte that contains an electrolyte salt is excellent in high temperature storage characteristics and cycling characteristics at high voltages.

The compounds of (I) to (III) are contained in the total amount of not more than 5000 ppm, preferably not more than 3500 ppm, and more preferably not more than 2500 ppm, relative to the fluorinated linear carbonate. If the total amount of the compounds of (I) to (III) is larger than 5000 ppm, discharge characteristics after storage at high temperatures tend to be lowered more. The unit "ppm" is defined as above.

EXAMPLES

In the following, the present invention is more specifically described with reference to examples and comparative examples. The present invention is not limited to these examples.

Synthesis 1: How to Synthesize $CF_3CH_2OCO_2CH_3$

A reactor including a four-neck flask (10 L) equipped with a reflux tube and an addition funnel was prepared. In an ice bath, $CF_3CH_2OH$ (750 g; 7.5 mol), methyl chloroformate (708.8 g; 7.5 mol), and a solvent that was diglyme (700 mL) were stirred in the reactor. Then, triethylamine (758.3 g; 7.5 mol) was added thereto via an addition funnel with attention to avoiding heating. Triethylamine hydrochloride was gradually deposited and the color of the reaction solution was turned into milky white.

After the reaction, the reaction solution was washed with a 1 N HCl aqueous solution.

After washing, a separated organic layer was rectified using a distillation column with 10 plates. The first drops, which are about 5% of the distillate, were disposed, and following drops were sampled in the same amounts in the distillation order, thereby preparing rectifications A, B, and C which were different in the $CF_3CH_2OH$ (compound (I-1)), $CH_3OH$ (compound (II-1)), and $CH_3OCOCl$ (compound (III-1)) contents.

The rectifications A to C were subjected to gas chromatography (GC-17A from Shimadzu Corporation, Column: DB624 (Length 60, I.D 0.32, Film 1.8 μm), temperature rise from 50° C. to 250° C. at a rate of 10° C./min, injection and detector (FID) both at 250° C.). Thus, the purity of $CF_3CH_2OCO_2CH_3$ and the amounts of compounds (I-1), (II-1), and (III-1) relative to $CF_3CH_2OCO_2CH_3$ were obtained. Table 1 shows the results.

TABLE 1

| | | Amount (ppm) | | | Total amount of Compounds |
| | Purity (%) | Compound (I-1) | Compound (II-1) | Compound (III-1) | (I) to (III) (ppm) |
| --- | --- | --- | --- | --- | --- |
| Rectification A | 99.05 | 4000 | 1500 | 2700 | 8200 |
| Rectification B | 99.45 | 2900 | 600 | 1400 | 4900 |
| Rectification C | 99.68 | 1500 | 200 | 600 | 2300 |

Synthesis 2: How to Synthesize $CF_3CH_2OCO_2C_2H_5$

A reactor including a four-neck flask (10 L) equipped with a reflux tube and an addition funnel was prepared. In an ice bath, $CF_3CH_2OH$ (750 g; 7.5 mol), ethyl chloroformate (813.3 g; 7.5 mol), and a solvent that was diglyme (1250 mL) were stirred in the reactor. Then, triethylamine (758.3 g; 7.5 mol) was added thereto via an addition funnel with careful attention to heating. Triethylamine hydrochloride was gradually deposited and the color of the reaction solution was turned into milky white. After the reaction, the reaction solution was washed with a 1 N HCl aqueous solution.

After washing, a separated organic layer was rectified using a distillation column with 10 plates. The first drops, which are about 5% of the distillate, were disposed, and following drops were sampled in the same amounts in the distillation order, thereby preparing rectifications D, E, and F which were different in the $CF_3CH_2OH$ (compound (I-1)), $C_2H_5OH$ (compound (II-2)), and $C_2H_5OCOCl$ (compound (III-2)) contents.

The rectifications D to F were subjected to gas chromatography (GC-17A from Shimadzu Corporation, Column: DB624 (Length 60, I.D 0.32, Film 1.8 μm), temperature rise from 50° C. to 250° C. at a rate of 10° C./min, injection and detector (FID) both at 250° C.). Thus, the purity of $CF_3CH_2OCO_2C_2H_5$, and the amounts of compounds (I-1), (II-2), and (III-2) relative to $CF_3CH_2OCO_2C_2H_5$ were obtained. Table 2 shows the results.

TABLE 2

|  | Purity (%) | Amount (ppm) Compound (I-1) | Compound (II-2) | Compound (III-2) | Total amount of Compounds (I) to (III) (ppm) |
| --- | --- | --- | --- | --- | --- |
| Rectification D | 99.02 | 2200 | 2700 | 4200 | 9100 |
| Rectification E | 99.49 | 550 | 850 | 3200 | 4600 |
| Rectification F | 99.70 | 200 | 100 | 2100 | 2400 |

Synthesis 3: How to Synthesize $CF_3CH_2OCO_2CH_3$

A reactor including a four-neck flask (10 L) equipped with a reflux tube and an addition funnel was prepared. In an ice bath, $CF_3CH_2OH$ (750 g; 7.5 mol), methyl chloroformate (708.8 g; 7.5 mol), and a solvent that was diglyme (700 mL) were stirred in the reactor. Then, triethylamine (758.3 g; 7.5 mol) was added thereto via an addition funnel with careful attention to heating. Triethylamine hydrochloride was gradually deposited and the color of the reaction solution was turned into milky white.

After the reaction, the reaction solution was washed with a 1 N HCl aqueous solution.

After washing, a separated organic layer was rectified using a distillation column with 10 plates. The rectification was performed using a distillation column with 10 plates under reduced pressure (15 KPa) at 65° C. The first drops, which are about 5% of the distillate, were disposed, and following drops were sampled in the same amounts in the distillation order, thereby preparing rectifications G, H, and I which were different in the $CF_3CH_2OH$ (compound (I-1)), $CH_3OH$ (compound (II-1)), and $CH_3OCOCl$ (compound (III-1)) contents.

The rectifications G to I were subjected to gas chromatography (GC-17A from Shimadzu Corporation, Column: DB624 (Length 60, I.D 0.32, Film 1.8 μm), temperature rise from 50° C. to 250° C. at a rate of 10° C./min, injection and detector (FID) both at 250° C.). Thus, the purity of $CF_3CH_2OCO_2CH_3$, and the amounts of compounds (I-1), (II-1), and (III-1) relative to $CF_3CH_2OCO_2CH_3$ were obtained. Table 3 shows the results.

and ethyl methyl carbonate (volume ratio of 3:7), and then, sufficiently dried $LiPF_6$ was dissolved therein such that the proportion of the $LiPF_6$ becomes 1 mol/L. Thus, an electrolyte was prepared.

(Production of Coin Battery)

A positive electrode active material containing $LiNi_{1/3}Mn_{1/3}CO_{1/3}O_2$, carbon black, and polyvinylidene fluoride (KF-7200 (trade name) from KUREHA CORPORATION) at a ratio of 92/3/5 (% by mass) was dispersed in N-methyl-2-pyrrolidone, thereby preparing a positive electrode composition slurry. The resulting positive electrode composition slurry was uniformly applied onto an aluminum collector, and dried to form a positive electrode composition layer (50 μm in thick). Then, the layer was compression-molded using a roller press, thereby producing a positive electrode laminate. From the positive electrode laminate, a portion with a diameter of 1.6 mm was punched using a punching machine. Thus, a circular positive electrode was produced.

Separately, styrene-butadiene rubber dispersed in distilled water was added to artificial graphite powder such that the amount of the rubber becomes 6% by mass in solids. The resulting mixture was mixed with a disperser to give slurry. The slurry was uniformly applied onto a negative electrode collector (10 μm-thick copper foil) and dried to form a negative electrode component layer. Then, the layer was compression-molded using a roller press, and a portion with a diameter of 1.6 mm was punched therefrom using a punching machine. Thus, a circular negative electrode was produced.

The positive electrode and the negative electrode were set to face each other with a microporous polyethylene film (separator) having a thickness of 20 μm interposed therebetween, and an electrolyte was injected to that layered product. After the electrolyte sufficiently penetrated the separator and the like, the layered product was encapsulated, pre-charged, and aged. Thus, a coin-type lithium ion secondary battery was produced.

TABLE 3

|  | Purity (%) | Amount (ppm) Compound (I-1) | Compound (II-1) | Compound (III-1) | Total amount of Compounds (I) to (III) (ppm) |
| --- | --- | --- | --- | --- | --- |
| Rectification G | 97.5 | 25000 | 0 | 0 | 25000 |
| Rectification H | 99.4 | 6000 | 0 | 0 | 6000 |
| Rectification I | 99.9< | 0 | 0 | 0 | 0 |

Example 1

Under a dried argon atmosphere, 3 parts by mass of $CF_3CH_2OCO_2CH_3$ of the rectification C was added to 97 parts by mass of a mixture containing ethylene carbonate (Measurement of Battery Characteristics)

The cycling characteristics at high voltages and high temperature storage characteristics of the coin-type lithium ion secondary battery were measured in the following procedure.

Discharge and Charge Conditions

Charge: charged at 0.5 C and 4.3 V until the charge current reached 1/10 C(CC-CV charge)

Discharge: at 0.5 C and cut at 3.0 V (CC discharge)

(Cycling Characteristics at High Voltages)

How to measure the cycling characteristics at high voltages is described below. A charge/discharge cycle under the above conditions (charged at 1.0 C and a predetermined voltage until the charge current reached 1/10 C, and discharged at a current corresponding to 1 C until the voltage reached 3.0 V) is regarded as 1 cycle. The discharge capacity was measured after 5 cycles and 100 cycles. With regard to the cycling characteristics at high voltages, the value calculated by the following equation is regarded as the value showing capacity retention. Table 4 shows the results.

Capacity retention (%) =

$$\frac{\text{Discharge capacity after 100 cycles (mAh)}}{\text{Discharge capacity after 5 cycles (mAh)}} \times 100$$

(High Temperature Storage Characteristics)

The high temperature storage characteristics were determined as follows. The battery was charged and discharged under the above conditions (charged at 1.0 C and a predetermined voltage until the charge current reached 1/10 C, and discharged at a current corresponding to 1 C until the voltage reached 3.0 V), and the discharge capacity was measured. Then, the battery was charged again under the above charge condition, and stored in an isothermal chamber at 85° C. for a day. The battery after storage was placed at a temperature of 25° C. and is discharged under the above discharge condition to the discharge cut-off voltage of 3 V. Then, the discharge capacity was measured. The battery was further charged under the above discharge condition and discharged at a constant current under the discharge condition to the discharge cut-off voltage of 3 V. Then, the recovery capacity was measured. Table 4 shows the recovery capacity based on the discharge capacity before storage set to 100.

Example 2

A battery was produced and tested in the same manner as in Example 1, except that $CF_3CH_2OCO_2CH_3$ of the rectification C was changed to $CF_3CH_2OCO_2CH_3$ of the rectification B.

Example 3

A battery was produced and tested in the same manner as in Example 1, except that $CF_3CH_2OCO_2CH_3$ of the rectification C was changed to $CF_3CH_2OCO_2C_2H_5$ of the rectification F.

Example 4

A battery was produced and tested in the same manner as in Example 1, except that $CF_3CH_2OCO_2CH_3$ of the rectification C was changed to $CF_3CH_2OCO_2C_2H_5$ of the rectification E.

Example 5

A battery was produced and tested in the same manner as in Example 1, except that $CF_3CH_2OCO_2CH_3$ of the rectification C was changed to $CF_3CH_2OCO_2CH_3$ of the rectification I.

Comparative Example 1

A battery was produced and tested in the same manner as in Example 1, except that $CF_3CH_2OCO_2CH_3$ of the rectification C was changed to $CF_3CH_2OCO_2CH_3$ of the rectification A.

Comparative Example 2

A battery was produced and tested in the same manner as in Example 1, except that $CF_3CH_2OCO_2CH_3$ of the rectification C was changed to a compound containing $CF_3CH_2OCO_2CH_3$ of the rectification C and the compound (I-1) in an amount of 10000 ppm relative to the rectification C.

Comparative Example 3

A battery was produced and tested in the same manner as in Example 1, except that $CF_3CH_2OCO_2CH_3$ of the rectification C was changed to a compound containing $CF_3CH_2OCO_2CH_3$ of the rectification C and the compound (II-1) in an amount of 10000 ppm relative to the rectification C.

Comparative Example 4

A battery was produced and tested in the same manner as in Example 1, except that $CF_3CH_2OCO_2CH_3$ of the rectification C was changed to a compound containing $CF_3CH_2OCO_2CH_3$ of the rectification C and the compound (III-1) in an amount of 10000 ppm relative to the rectification C.

Comparative Example 5

A battery was produced and tested in the same manner as in Example 1, except that $CF_3CH_2OCO_2CH_3$ of the rectification C was changed to $CF_3CH_2OCO_2C_2H_5$ of the rectification D.

Comparative Example 6

A battery was produced and tested in the same manner as in Example 1, except that $CF_3CH_2OCO_2CH_3$ of the rectification C was changed to a compound containing $CF_3CH_2OCO_2C_2H_5$ of the rectification F and the compound (I-1) in an amount of 10000 ppm relative to the rectification F.

Comparative Example 7

A battery was produced and tested in the same manner as in Example 1, except that $CF_3CH_2OCO_2CH_3$ of the rectification C was changed to a compound containing $CF_3CH_2OCO_2C_2H_5$ of the rectification F and the compound (II-2) in an amount of 10000 ppm relative to the rectification F.

Comparative Example 8

A battery was produced and tested in the same manner as in Example 1, except that $CF_3CH_2OCO_2CH_3$ of the rectification C was changed to a compound containing $CF_3CH_2OCO_2C_2H_5$ of the rectification F and the compound (III-2) in an amount of 10000 ppm relative to the rectification F.

TABLE 4

|  | High voltage cycle test Capacity retention (%) | High temperature storage test Recovery capacity |
| --- | --- | --- |
| Example 1 | 96.8 | 93.0 |
| Example 2 | 95.7 | 91.2 |
| Example 3 | 95.5 | 91.8 |
| Example 4 | 94.8 | 90.3 |
| Example 5 | 95.0 | 96.0 |
| Comparative Example 1 | 87.7 | 82.3 |
| Comparative Example 2 | 86.9 | 80.9 |
| Comparative Example 3 | 83.9 | 77.6 |
| Comparative Example 4 | 81.5 | 74.3 |
| Comparative Example 5 | 86.8 | 81.5 |
| Comparative Example 6 | 85.8 | 79.8 |
| Comparative Example 7 | 82.5 | 76.8 |
| Comparative Example 8 | 80.8 | 72.9 |

In comparison of Examples 1 to 5 and Comparative Examples 1 to 8 in Table 4, it is clear that, when the total amount of the compounds (I) to (III) in the nonaqueous solvent is set to not more than 5000 ppm, high temperature storage characteristics and cycling characteristics at high voltages are improved. In comparison of Example 1 and Example 2 or in comparison of Example 3 and Example 4, it is clear that, when the total amount of the compounds (I) to (III) in the nonaqueous solvent is set to not more than 2500 ppm, such characteristics are further improved.

The invention claimed is:

1. An electrochemical device comprising:
   a positive electrode;
   a negative electrode; and
   a nonaqueous electrolyte containing a nonaqueous solvent and an electrolyte salt,
   wherein the nonaqueous solvent contains a fluorinated linear carbonate represented by the formula (1):

RfOCOOR (1)

(wherein Rf represents a C1-4 fluorinated alkyl group and R represents a C1-4 alkyl group), and further contains following compounds of (I) to (III) in a total amount of not more than 2500 ppm relative to the fluorinated linear carbonate:

(I) a compound represented by the formula (2)

RfOH (2)

(wherein Rf is defined as above);
   (II) a compound represented by the formula (3)

ROH (3)

(wherein R is defined as above); and
   (III) a compound represented by the formula (4)

ROCOCl (4)

(wherein R is defined as above).

2. The electrochemical device according to claim 1, wherein the fluorinated linear carbonate is $CF_3CH_2OCOOCH_3$ or $CF_3CH_2OCOOCH_2CH_3$.

3. The electrochemical device according to claim 1, wherein the amount of the fluorinated linear carbonate represented by the formula (1) is 0.01 to 90% by mass in the nonaqueous solvent.

4. The electrochemical device according to claim 1, wherein the electrochemical device is a lithium ion secondary battery.

5. A nonaqueous electrolyte for an electrochemical device, comprising:
   a nonaqueous solvent; and
   an electrolyte salt,
   wherein the nonaqueous solvent contains a fluorinated linear carbonate represented by the formula (1):

RfOCOOR (1)

(wherein Rf represents a C1-4 fluorinated alkyl group and R represents a C1-4 alkyl group), and further contains following compounds of (I) to (III) in a total amount of not more than 2500 ppm relative to the fluorinated linear carbonate:

(I) a compound represented by the formula (2)

RfOH (2)

(wherein Rf is defined as above);
   (II) a compound represented by the formula (3)

ROH (3)

(wherein R is defined as above); and
   (III) a compound represented by the formula (4):

ROCOCl (4)

(wherein R is defined as above).

* * * * *